US007669409B2

(12) United States Patent
Driscoll et al.

(10) Patent No.: US 7,669,409 B2
(45) Date of Patent: Mar. 2, 2010

(54) SELECTIVE OXIDATION CATALYST INJECTION BASED ON TEMPERATURE

(75) Inventors: James Joshua Driscoll, Dunlap, IL (US); Thomas Edward Paulson, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 171 days.

(21) Appl. No.: 11/589,833

(22) Filed: Oct. 31, 2006

(65) Prior Publication Data

US 2008/0098727 A1 May 1, 2008

(51) Int. Cl.
    *F01N 3/023* (2006.01)
(52) U.S. Cl. .......................................... 60/286; 60/295
(58) Field of Classification Search ................ 60/286, 60/297, 295, 311; 123/698, 1 A, 25 A, 25 C, 123/25 E, 575–577
    See application file for complete search history.

(56) References Cited

U.S. PATENT DOCUMENTS

| | | | | |
|---|---|---|---|---|
| 4,359,862 A * | 11/1982 | Virk et al. | ...................... | 60/274 |
| 4,665,690 A * | 5/1987 | Nomoto et al. | ............... | 60/286 |
| 5,711,149 A * | 1/1998 | Araki | .......................... | 60/278 |
| 5,758,496 A * | 6/1998 | Rao et al. | ..................... | 60/295 |
| 5,839,276 A * | 11/1998 | Nishizawa | ................... | 60/288 |
| 5,928,392 A * | 7/1999 | Aradi | .......................... | 44/359 |
| 5,953,906 A * | 9/1999 | Gamel et al. | ................... | 60/274 |
| 6,003,303 A * | 12/1999 | Peter-Hoblyn et al. | ........ | 60/274 |
| 6,023,928 A * | 2/2000 | Peter-Hoblyn et al. | ........ | 60/274 |
| 6,051,040 A * | 4/2000 | Peter-Hoblyn | ............... | 44/358 |
| 6,056,792 A * | 5/2000 | Barr et al. | ..................... | 44/403 |
| 6,237,326 B1 | 5/2001 | Russell | | |
| 6,397,584 B2 | 6/2002 | Salvat et al. | | |
| 6,484,496 B2 * | 11/2002 | Le Tallec et al. | .............. | 60/295 |
| 6,629,407 B2 * | 10/2003 | Roos et al. | ..................... | 60/274 |
| 6,820,414 B2 | 11/2004 | Stroia et al. | | |
| 6,823,664 B2 | 11/2004 | Nakatani et al. | | |
| 6,862,881 B1 * | 3/2005 | Klingbeil et al. | .............. | 60/295 |
| 6,883,310 B2 | 4/2005 | Nakatani et al. | | |
| 6,941,743 B2 * | 9/2005 | Roos et al. | ..................... | 60/274 |
| 7,031,827 B2 * | 4/2006 | Trudell et al. | ............... | 701/114 |
| 7,047,729 B2 | 5/2006 | van Nieuwstadt et al. | | |
| 7,076,944 B2 | 7/2006 | Okugawa et al. | | |
| 7,111,455 B2 | 9/2006 | Okugawa et al. | | |
| 7,152,397 B2 * | 12/2006 | Colignon | ..................... | 60/295 |
| 2001/0010152 A1 * | 8/2001 | Tallec et al. | ................... | 60/295 |
| 2003/0226312 A1 * | 12/2003 | Roos et al. | ..................... | 44/280 |
| 2004/0074140 A1 * | 4/2004 | Guinther et al. | ............... | 44/354 |

FOREIGN PATENT DOCUMENTS

GB         2421589 A         6/2006

* cited by examiner

*Primary Examiner*—Thomas E Denion
*Assistant Examiner*—Jonathan Matthias
(74) *Attorney, Agent, or Firm*—Finnegan, Henderson, Farabow, Garrett & Dunner

(57) ABSTRACT

An exhaust treatment system for a combustion source is disclosed. The exhaust treatment system may have a supply of catalyst configured to lower the combustion threshold value of an exhaust constituent, and an injector operable to selectively pass catalyst to the exhaust constituent. The exhaust treatment system may further have a controller in communication with the injector. The controller may be configured to determine a temperature of an exhaust flow, and operate the injector to pass catalyst in response to the combustion threshold value being greater than the determined temperature.

12 Claims, 2 Drawing Sheets

SELECTIVE OXIDATION CATALYST INJECTION BASED ON TEMPERATURE

TECHNICAL FIELD

The present disclosure is directed to a system for injecting an oxidation catalyst solution into a fuel or exhaust stream and, more particularly, to a system that selectively injects the oxidation catalyst solution based on an exhaust temperature.

BACKGROUND

Internal combustion engines, including diesel engines, gasoline engines, gaseous fuel-powered engines, and other engines known in the art, exhaust a complex mixture of air pollutants. These air pollutants may include solid material known as particulate matter or soot. Due to increased awareness of the environment, exhaust emission standards have become more stringent and the amount of particulate matter emitted from an engine may be regulated depending on the type of engine, size of engine, and/or class of engine.

One method implemented by engine manufacturers for complying with the regulation of particulate matter exhausted to the environment has been to remove the particulate matter from the exhaust flow of an engine using a device called a particulate trap. A particulate trap is a filter, typically consisting of a wire mesh or ceramic honeycomb medium, which is designed to trap particulate matter. Unfortunately, the use of the particulate trap for extended periods of time may cause the particulate matter to build up in the medium, thereby reducing the functionality of the filter and subsequent performance of the engine.

Built-up particulate matter may be removed from the filter through a process called regeneration. To initiate regeneration of the filter, the temperature of the particulate matter captured within the filter must be elevated to a combustion threshold, at which the particulate matter may slowly burn away. Often, the temperature of the exhaust flow as emitted by the engine raises the particulate temperature to that sufficient for regeneration. During some situations however, such as low engine load or during the winter months, the temperature of the exhaust may be insufficient to raise the particulate matter to the required combustion threshold.

One way to remedy this problem is to artificially reduce the combustion threshold of the collected particulate matter to a temperature below that of the exhaust such that regeneration can be achieved. An example of a system that implements this method is described in U.S. Pat. No. 6,397,584 (the '584 patent) issued to Salvat et al. on Jun. 4, 2002. Specifically, the '584 patent discloses a system for assisting the regeneration of a particle filter integrated into an exhaust line of a motor vehicle diesel engine. This system includes a supply of additive, which is continuously injected into a fuel tank of the engine. The additive mixes with the fuel, and the mixture is combusted to produce a flow of exhaust containing soot particles bonded with a metal compound. The compound-bonded particle has a lower ignition temperature than non-bonded particles. When the lowered ignition temperature is attained with the engine's exhaust flow, the soot particles and metal compounds are burned, leaving behind ash, which may be effectively removed from the filter during periodic maintenance of the engine.

Although the system of the '584 patent may suitably regenerate a particulate filter, it may be costly and problematic. In particular, the low-temperature situations requiring the injection of the additive may be intermittent and, because the system of the '584 patent always injects that additive, some additive may be wasted. This wasted additive drives up the cost of the system. In addition, because the additive is converted to ash during the regeneration process, excessive amounts of additive may result in excessive amounts of ash. Because the maintenance interval of the engine may be at least partially based on the accumulation rate of ash within the particle filter, the excessive amounts of ash may significantly reduce the maintenance interval. A reduced maintenance interval, in addition to creating an inconvenience for the vehicle owner, also serves to increase the operating cost of the vehicle.

The system of the present disclosure solves one or more of the problems set forth above.

SUMMARY OF THE INVENTION

One aspect of the present disclosure is directed to an exhaust treatment system. The exhaust treatment system may include a supply of catalyst configured to lower the combustion threshold value of an exhaust constituent, and an injector operable to selectively pass the catalyst to the exhaust constituent. The exhaust treatment system may further include a controller in communication with the injector. The controller may be configured to determine a temperature of an exhaust flow, and operate the injector to pass the catalyst in response to the combustion threshold value being greater than the determined temperature.

Yet another aspect of the present disclosure is directed to a method of treating exhaust. The method may include collecting a constituent of the exhaust, and determining a temperature of the collected constituent. The method may further include mixing a catalyst with the constituent to lower the combustion threshold of the collected constituent when the combustion threshold is greater than the determined temperature.

DETAILED DESCRIPTION

Figure 1:
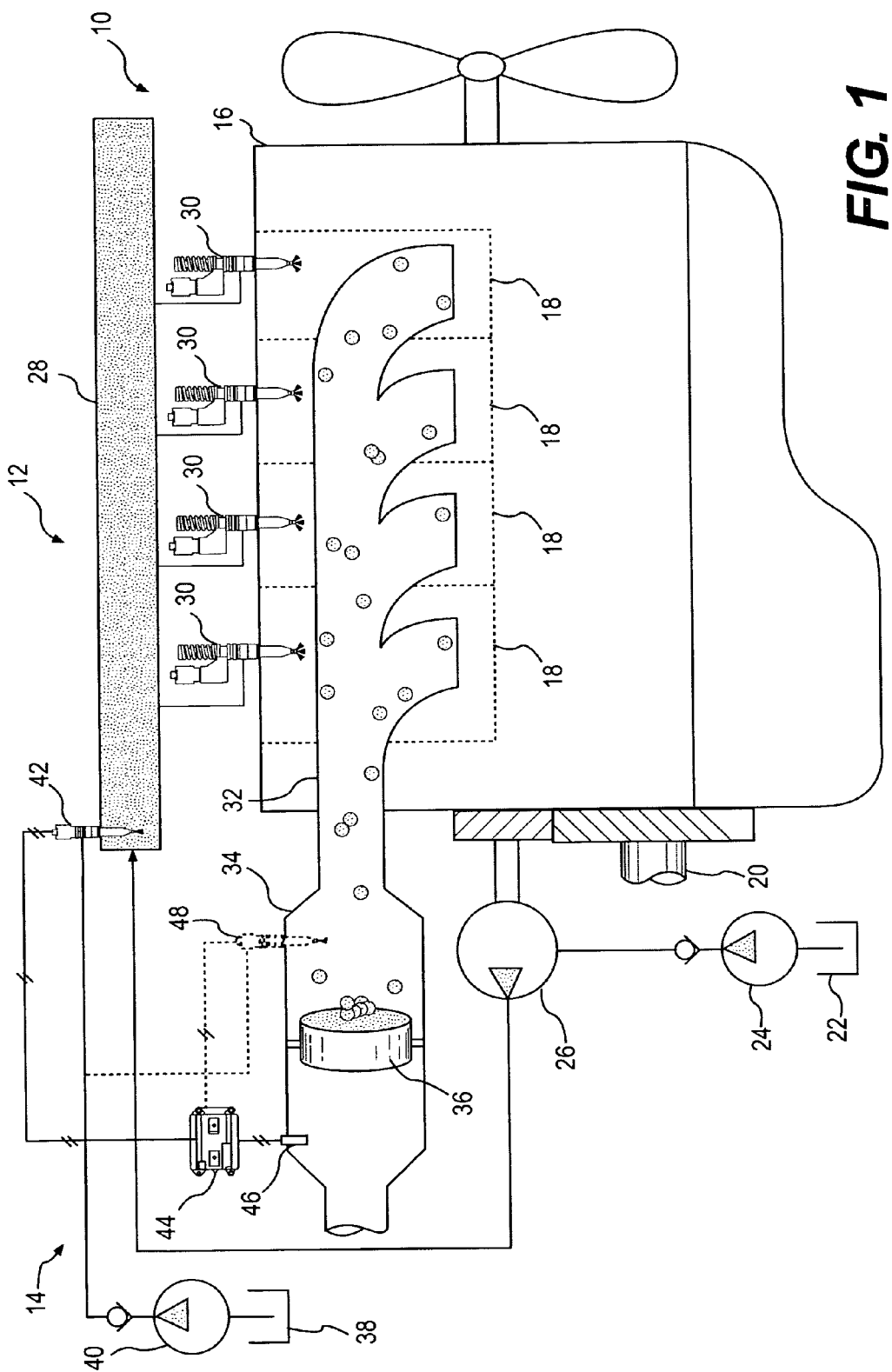
FIG. 1 is a schematic and diagrammatic illustration of an exemplary disclosed power system.

FIG. 1 illustrates a power system including a power unit 10, a fuel system 12, and an exhaust treatment system 14. In one embodiment, the power system may be associated with a mobile vehicle such as a passenger vehicle, a vocational vehicle, a farming vehicle or a construction vehicle. Alternatively, the power system may be associated with a stationary machine such as an industrial power generator or a furnace.

For the purposes of this disclosure, power unit 10 is depicted and described as a four-stroke diesel engine. One skilled in the art will recognize, however, that power unit 10 may be any other type of internal combustion engine such as, for example, a gasoline engine, a gaseous fuel-powered engine, or a turbine engine. Power unit 10 may include an engine block 16 that at least partially defines a plurality of combustion chambers 18. In the illustrated embodiment, power unit 10 includes four combustion chambers. However, it is contemplated that power unit 10 may include a greater or lesser number of combustion chambers and that the combustion chambers may be disposed in an "in-line" configuration, a "V" configuration, or any other suitable configuration.

As also shown in FIG. 1, power unit 10 may include a crankshaft 20 that is rotatably disposed within engine block 16. A connecting rod (not shown) may connect a plurality of pistons (not shown) to crankshaft 20 so that a sliding motion of each piston within its respective combustion chamber results in a rotation of crankshaft 20. Similarly, a rotation of crankshaft 20 may result in a sliding motion of the pistons. Rotation of crankshaft 20 may function as output from power unit 10 for effecting a desired work such as rotation of a generator or rotation of one or more drive axels of an associated vehicle.

Fuel system 12 may include a fuel tank 22. Fuel tank 22 may be configured to store a supply of fuel such as, for example, diesel fuel. Fuel from fuel tank 22 may be initially drawn into a system of fuel lines by a transfer pump 24, which may be in fluid communication with the tank and a high pressure pump 26. Transfer pump 24 may have at least sufficient power to convey fuel from tank 22 to high pressure pump 26. High pressure pump 26 may be powered either directly or indirectly by rotation of crankshaft 20. For example, a system of meshing gears between crankshaft 20 and the shaft input to high pressure pump 26 may provide a proportionally desired rotation. According to one embodiment, rotation of crankshaft 20 may bring the pressure of the fuel from high pressure pump 26 to approximately 300 MPa.

High pressure pump 26 may also be in fluid communication with a common rail 28 and may be configured so as to convey pressurized fuel to common rail 28. Common rail 28, also known as a fuel manifold, may be in fluid communication with one or more fuel injectors 30. As illustrated in FIG. 1, each injector may be disposed within one of the four combustion chambers 18. Therefore common rail 28 may provide a supply of fuel at the desired pressure as induced by high pressure pump 26 to each of the fuel injectors 30. In such a configuration of the presently disclosed fuel supply system, each fuel injector of injectors 30 may selectively convey pressurized fuel from common rail 28 to a respective one of combustion chambers 18.

Fuel system 12 may also work in conjunction with exhaust treatment system 14. Exhaust treatment system 14 may include an exhaust manifold 32 having exhaust passageways, each passageway being in fluid communication with an associated one of combustion chambers 18 of power unit 10. Exhaust manifold 32 may expel exhaust flow away from power unit 10 towards a housing 34 located downstream from exhaust manifold 32.

Housing 34 of exhaust treatment system 14 may be a cylindrical or tubular conduit for directing exhaust gasses and particulates away from power unit 10 for processing by various emission controlling devices. In one embodiment, exhaust manifold 32 may be integral with housing 34. For example, an exhaust manifold and housing may be integrally stamped or forged from metal. Alternatively, exhaust manifold 32 may be secured to housing 34 by one or more fasteners (e.g., rivets, nuts and bolts, etc.) or by deformation (e.g., hemming). Housing 34 may also constitute structural support for at least one emission controlling device of the system.

The at least one emission controlling device of exhaust treatment system 14 may include a particulate filter 36. Particulate filter 36 may be disposed across the cylindrical width (i.e., cross section) of housing 34. Furthermore, particulate filter 36 may be either removably or fixedly secured at its perimeter to housing 34. Particulate filter 36 may be any variety of diesel particulate filter ("DPF") such as, for example, a corderite or silicon carbide wall-flow filter, a metal fiber flow-through filter or a partial filter. According to one embodiment of the present disclosure, particulate filter 36 may be a wall-flow filter having at least 99% efficiency of particulate filtration. Moreover, it is contemplated that exhaust treatment system 14 may include other components such as, for example, a turbine, an exhaust gas recirculation system, a catalytic treatment device, or any other exhaust system component known in the art.

Exhaust treatment system 14 may also include devices that provide a supply of catalyst solution to a fuel or exhaust flow. Specifically, exhaust treatment system 14 may include a catalyst tank 38 configured to store a supply of catalyst. The catalyst, also known as a fuel born catalyst ("FBC"), may include, for example, platinum, copper, cerium, manganese and/or iron compounds. Exemplary commercial catalysts contemplated for use include Eolys®, which is marketed by Rhodia; Platinum Plus®, which is marketed by Clean Diesel Technologies; Octimax 4800®, which is marketed by Octel; and, MMT, which is marketed by Ethyl Corporation. The catalyst may be drawn from catalyst tank 38 by a pump 40, which is in fluid communication with catalyst tank 38. Pump 40 may also be in fluid communication with a catalyst injector 42 such that it may provide a supply of catalyst to the injector.

As illustrated in FIG. 1, catalyst injector 42 may be disposed at an upstream end of common rail 28. In particular, catalyst injector 42 may be mounted to common rail 28 such that the nozzle of the injector is in fluid communication with the pressurized fuel therein. Although depicted as being in fluid communication with common rail 28, catalyst injector 42 could alternatively inject catalyst directly into fuel tank 22, into fuel lines between tank 22 and common rail 28, or into fuel lines between common rail 28 and the individual injectors 30. In particular, it may be advantageous to inject the catalyst as close as possible to particulate filter 36 along the length of the fuel or exhaust flow in order to improve the responsiveness of the catalyst injection to a detected temperature deficiency. On the other hand, injection of the catalyst at a location too close to particulate filter 36 may provide insufficient time for the catalyst to mix thoroughly with the fuel or exhaust flow. Other advantages of and modifications to incorporation of the catalyst injector at various points along the length of fuel system 12 or exhaust treatment system 14 will also be apparent to those of skill in the art.

In another embodiment of the present disclosure, a catalyst injector may alternatively be disposed so as to inject the catalyst directly into an exhaust flow of exhaust treatment system 14. For example, as shown in FIG. 1, a catalyst injector 48 may replace catalyst injector 42 in the event that injection into an exhaust flow is desired over injection into a fuel supply. In this embodiment, catalyst injector 48 may be mounted to housing 34 such that the nozzle of the injector is in fluid communication with the exhaust flow therein. Because catalyst injector 48 may be disposed upstream from particulate filter 36, injection of catalyst may affect regeneration at particulate filter 36.

As also illustrated in FIG. 1, a sensor 46 may be disposed downstream from particulate filter 36. Specifically, sensor 46 may be mounted to housing 34 such that it may measure a temperature of the exhaust flow therein. Alternatively, sensor 46 may measure a temperature of particulate filter 36 and/or a temperature of its captured particulates. That is, sensor 46 may be thermally coupled with the particulate filter 36 so as to determine its temperature. Sensor 46 may also be located upstream of filter 36, if desired. In either embodiment, sensor 46 may be operable to generate a signal indicative of the temperature of particulate matter trapped within filter 36.

Exhaust treatment system 14 may also include a controller 44 such as an electronic engine control module ("ECM") or an injector control module. Controller 44 may be disposed in communication with sensor 46 and catalyst injector 42 to receive a temperature signal from sensor 46 and to transmit an injection signal to catalyst injector 42 in response thereto. Various circuits may be associated with controller 44 such as, for example, power supply circuitry, signal conditioning circuitry, solenoid driver circuitry, and other appropriate circuitry. Moreover, because sensor 46 and catalyst injector 42 may be in communication with controller 44 by either wired or wireless transmission, controller 44 may be disposed in a location remote from housing 34 or common rail 28, if desired.

In another embodiment of the present disclosure, the temperature of the exhaust flow and particulate filter may be estimated by controller 44 rather than measured by sensor 46. That is, controller 44 may determine the temperature as a function of variables relating to one or more known operating conditions of power unit 10 and/or a vehicle associated therewith. For example, one or more engine performance maps relating a fueling amount, ignition timing, power output, engine speed, boost pressure, engine temperature, an air/fuel ratio, and/or other known parameters may be stored within the memory of controller 44. Each of these maps may be in the form of tables, graphs, and/or equations and include a compilation of data collected from lab and/or field operation of power unit 10. Controller 44 may reference one or more of these maps in order to estimate a temperature associated with particulate filter 36 for a given operating condition of power unit 10.

Controller 44 may therefore create and store a continuous history of either measured or estimated temperature data from which decisions about catalyst injection may be made.

Figure 2:
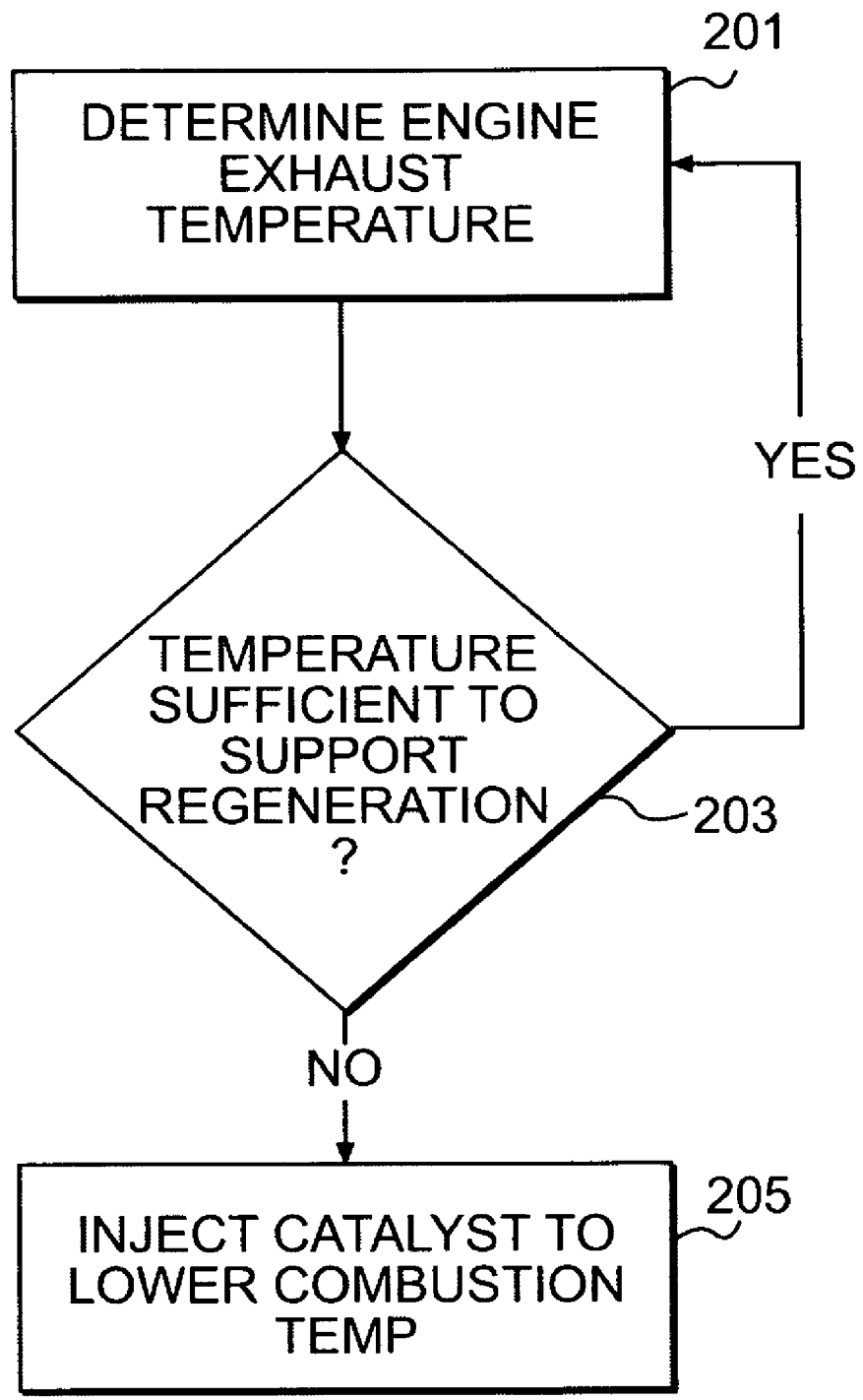
FIG. 2 is a flowchart depicting an exemplary disclosed operation of the power system of FIG. 1.

The flow chart of FIG. 2 depicts an exemplary method according to one embodiment of the present disclosure. FIG. 2 will be described in the following section to better illustrate the disclosed system.

INDUSTRIAL APPLICABILITY

The disclosed exhaust treatment system of the present disclosure may be applicable to any combustion-type device such as, for example, an engine, a furnace, or any other device known in the art wherein it is desirable to remove particulate pollutants from an exhaust flow. The disclosed exhaust treatment system may be a simple, inexpensive and compact solution for selectively injecting a fuel-born catalyst solution into a fuel stream or exhaust flow, as necessary, based on a measured or estimated temperature. The operation of power unit 10, fuel system 12 and exhaust treatment system 14 will now be explained.

Referring to FIG. 1, a supply of fuel may be stored in fuel tank 22 and drawn by transfer pump 24 for conveyance to high pressure pump 26. There, the fuel pressure may be increased substantially for delivery to common rail 28, which is in fluid communication with fuel injectors 30. Fuel may be injected into combustion chambers 18 of power unit 10 by fuel injectors 30, mixed with the air therein, and combusted by power unit 10 to produce a mechanical work output and an exhaust flow of hot gases. The exhaust flow may contain a complex mixture of air pollutants, which can include solid particulates such as soot. The release of soot into the environment may be minimized by passing the exhaust flow through particulate filter 36 of housing 34. As this soot laden exhaust flow is directed from the combustion chambers through particulate filter 36, soot may build up in the filter thereby adversely affecting engine performance.

When the temperature of the exhaust flow is higher than the oxidation temperature of the soot, the soot will slowly "burn off" of the particulate filter over time. However, when the temperature of the exhaust flow is lower than the oxidation temperature of the soot, such as during low load or during winter months, it may be desirable to inject a catalyst into either the fuel or exhaust flow in order to lower the oxidation temperature of the soot. In particular, catalyst injection may increase the soot oxidation rate to that sufficient for passive regeneration (i.e., soot removal at a rate equal to or higher than the soot filtration rate). The catalyst, also known as a fuel born catalyst ("FBC"), may include, for example, platinum, copper, cerium, manganese and/or iron compounds. These oxidized metals may end up bonded to the soot that is trapped in the particulate filter so as to have the effect of catalyzing soot oxidation. That is, the oxidizing metals may lower the combustion threshold temperature of the soot to lower than the exhaust temperature, thereby facilitating relatively lower temperature regeneration. Alternatively, in the event that FBC injection is still insufficient to catalyze passive regeneration, a passive-"plus" configuration may be employed wherein a supplemental heating source promotes regeneration.

Turning now to FIG. 2, the temperature of the exhaust flow, particulate filter and/or particulates may be determined by sensor 46 (step 201). Temperature data may be communicated from sensor 46 to controller 44. Alternatively, controller 44 may estimate the exhaust flow temperature based on a known operation of power unit 10 (i.e., determined as a function of variables relating to power unit 10 and/or a vehicle associated therewith). Controller 44 may compare the measured or estimated exhaust temperature to the combustion threshold temperature of the particulates in order to determine whether or not the exhaust temperature is sufficient to support regeneration (step 203). Controller 44 may then send a signal instructing catalyst injection to a catalyst injector, such as catalyst injectors 42 and 44, in response to a determination that the exhaust temperature is insufficient for regeneration (step 205). In one embodiment, controller 44 sends an injection signal in response to a determination that the exhaust temperature has been continually insufficient for regeneration over a particular time interval.

Catalyst may be injected into either fuel tank 22, common rail 28 (e.g., by catalyst injector 42 as illustrated), the fuel lines between fuel tank 22 and common rail 28, or the fuel lines between common rail 28 and fuel injectors 30. Catalyst may alternatively be injected into the exhaust flow at a location upstream from particulate filter 36 by catalyst injector 48. Once particulate filter 36 has been regenerated or the engine has attained sufficiently high temperatures, controller 44 may instruct the one or more catalyst injectors to cease FBC injection.

The presently disclosed use of selective catalyst injection may be an ideal way to induce more efficient oxidation of trapped particulates. For example, it has been found that when used with a wall-flow filter, approximately 99% of fuel born catalysts may be filtered out or left in the engine oil or liner. Moreover, FBC injection may reduce the threshold temperature for passive regeneration by as much as 100° C. from the average combustion temperature of 300-350° C. That is, particulate material may be oxidized at the same rate from which it is filtered from the exhaust, even at only 250-300° C. However, the ash created during oxidation of FBC-bonded particulates may make it especially desirable to streamline catalyst injection by use of the presently disclosed concepts.

The benefit of selective catalyst additive may be evidenced in that even with only a 5 ppm FBC additive level, the amount of ash trapped by the filter is doubled over that trapped without use of an additive (250,000 miles: roughly 25 g/liter ash from lube oil, 25 g/liter ash due to FBC). The advantages of FBC dosing reduction on ash production was further established by a study in "Diesel Particulate Filter Maintenance:

Current Practices and Experience", June 2005, MECA. There, it was found that a reduction in FBC dosing from 25 ppm of FBC to 10 ppm of FBC resulted in a reduction in the proportion of FBC ash mass from approximately 80% to about 57%. Thus, there is a great incentive to reducing the amount of catalyst additive.

Because the present catalyst is only injected into the fuel or exhaust flow when the exhaust temperature history indicates persistently insufficient regeneration conditions, waste of excessive catalyst is decreased, ash production is decreased, and service intervals are increased. An increase in service intervals due to decreased ash accumulation may be associated with a decrease in the operating cost of a vehicle using such selective catalyst injection as disclosed herein. Moreover, vehicle operators may experience more convenience as a result of fewer maintenance trips.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust treatment system for a combustion source, comprising:
    a supply of catalyst configured to lower a combustion threshold value of an exhaust constituent;
    an injector operable to selectively pass catalyst to the exhaust constituent without injecting fuel, wherein the catalyst is passed into a fuel supply downstream of a fuel line delivering the fuel; and
    a controller in communication with the injector and configured to operate the injector to pass catalyst based on a condition of an exhaust flow.

2. The exhaust treatment system of claim 1, further including a sensor in fluid communication with the exhaust flow and in communication with the controller, the sensor being configured to generate a signal indicative of the exhaust flow temperature;
    wherein the controller is configured to:
        determine a temperature of the exhaust flow; and
        operate the injector to pass catalyst in response to the combustion threshold value being greater than the determined temperature.

3. The exhaust treatment system of claim 2, further including a collection device configured to collect the exhaust constituent, wherein the sensor is located downstream of the collection device.

4. The exhaust treatment system of claim 1, wherein the controller is configured to:
    determine a temperature of the exhaust flow based on a known operating condition of the combustion source; and
    operate the injector to pass catalyst in response to the combustion threshold value being greater than the determined temperature.

5. The exhaust treatment system if claim 1, wherein:
    the fuel supply includes:
        a tank;
        a manifold; and
        a pressure source configured to draw fuel from the tank, pressurize the fuel, and direct the pressurized fuel to the manifold; and
    the catalyst is passed into the manifold.

6. The exhaust treatment system of claim 1, wherein the catalyst is at least one of platinum, copper, cerium, manganese, and iron.

7. The exhaust treatment system of claim 1, wherein the exhaust constituent is particulate matter.

8. The exhaust treatment system of claim 7, further including a particulate filter configured to trap the particulate matter, wherein injections of the catalyst assist regeneration of the particulate filter.

9. A power system, comprising:
    a supply of fuel including a fuel line configured to deliver fuel to a fuel manifold;
    a supply of air;
    a combustion engine configured to receive and combust the supplies of fuel and air, and produce an exhaust flow containing particulate matter;
    a particulate trap configured to collect the particulate matter; and
    an injector configured to inject a catalyst into the supply of fuel downstream of the fuel line based on a condition of the exhaust flow and without also injecting fuel, the catalyst being configured to reduce a combustion threshold of the collected particulate matter.

10. The power system of claim 9, wherein the catalyst is at least one of platinum, copper, cerium, manganese, and iron.

11. The power system of claim 9 further including:
    a controller configured to:
        determine a temperature of the exhaust flow based on a known operating condition of the combustion source; and
        operate the injector to pass catalyst in response to the combustion threshold value being greater than the determined temperature.

12. The power system of claim 9, wherein:
    the fuel supply further includes:
        a tank; and
        a pressure source configured to draw fuel from the tank though the fuel line, pressurize the fuel, and direct the pressurized fuel to the manifold; and
    the injector injects the catalyst into the manifold.

* * * * *